(12) United States Patent
Tati et al.

(10) Patent No.: US 10,474,369 B2
(45) Date of Patent: Nov. 12, 2019

(54) MAPPING GUEST PAGES TO DISK BLOCKS TO IMPROVE VIRTUAL MACHINE MANAGEMENT PROCESSES

(71) Applicant: VMware, Inc., Palo Alto, CA (US)

(72) Inventors: Kiran Tati, Fremont, CA (US); Rajesh Venkatasubramanian, San Jose, CA (US); Carl A. Waldspurger, Palo Alto, CA (US); Alexander Thomas Garthwaite, Hamilton, MA (US); Tongping Liu, Amherst, MA (US)

(73) Assignee: VMware, Inc., Palo Alto, CA (US)

( * ) Notice: Subject to any disclaimer, the term of this patent is extended or adjusted under 35 U.S.C. 154(b) by 729 days.

(21) Appl. No.: 13/760,868

(22) Filed: Feb. 6, 2013

(65) Prior Publication Data

US 2013/0205106 A1    Aug. 8, 2013

Related U.S. Application Data

(60) Provisional application No. 61/595,522, filed on Feb. 6, 2012.

(51) Int. Cl.
*G06F 3/06* (2006.01)
*G06F 12/10* (2016.01)
*G06F 9/455* (2018.01)
*G06F 12/121* (2016.01)
*G06F 9/48* (2006.01)

(52) U.S. Cl.
CPC ............ *G06F 3/0613* (2013.01); *G06F 3/061* (2013.01); *G06F 3/065* (2013.01); *G06F 3/0607* (2013.01); *G06F 3/0647* (2013.01); *G06F 3/0655* (2013.01); *G06F 3/0683* (2013.01); *G06F 3/0689* (2013.01); *G06F 9/45558* (2013.01); *G06F 9/4856* (2013.01); *G06F 12/10* (2013.01);
(Continued)

(58) Field of Classification Search
None
See application file for complete search history.

(56) References Cited

U.S. PATENT DOCUMENTS 4,674,038 A * 6/1987 Brelsford ............ G06F 11/1441
714/15
4,922,414 A * 5/1990 Holloway ............... G06F 8/312
711/207

(Continued)

OTHER PUBLICATIONS

Live Migration of Virtual Machines; Christopher Clark; USENIX Association; NSDI '05: 2nd Symposium on Networked Systems Design & Implementation; 2005.*

(Continued)

*Primary Examiner* — Paul M Knight
(74) *Attorney, Agent, or Firm* — Patterson + Sheridan, LLP

(57) ABSTRACT

In a virtualized computer system, guest memory pages are mapped to disk blocks that contain identical contents and the mapping is used to improve management processes performed on virtual machines, such as live migration and snapshots. These processes are performed with less data being transferred because the mapping data of those guest memory pages that have identical content stored on disk are transmitted instead of the their contents. As a result, live migration and snapshots can be carried out more quickly. The mapping of the guest memory pages to disk blocks can also be used to optimize other tasks, such as page swaps and memory error corrections.

20 Claims, 7 Drawing Sheets

(52) U.S. Cl.
CPC .... *G06F 12/121* (2013.01); *G06F 2009/4557* (2013.01); *G06F 2212/151* (2013.01)

(56) References Cited

U.S. PATENT DOCUMENTS

| | | | | |
|---|---|---|---|---|
| 5,386,527 | A * | 1/1995 | Bosshart | G06F 12/1054 711/207 |
| 5,761,680 | A * | 6/1998 | Cohen | G06F 3/0607 |
| 6,226,695 | B1 * | 5/2001 | Kaiser | G06F 12/0817 710/24 |
| 6,233,666 | B1 * | 5/2001 | Mathews | G06F 12/08 711/111 |
| 6,317,818 | B1 * | 11/2001 | Zwiegincew | G06F 12/08 711/213 |
| 6,397,242 | B1 * | 5/2002 | Devine et al. | 718/1 |
| 6,738,882 | B1 * | 5/2004 | Gau | G11C 29/56 711/170 |
| 7,484,208 | B1 * | 1/2009 | Nelson | G06F 9/45558 711/6 |
| 7,702,843 | B1 * | 4/2010 | Chen et al. | 711/6 |
| 8,683,250 | B2 * | 3/2014 | Nayak | G06F 3/0625 713/324 |
| 2004/0117590 | A1 * | 6/2004 | Arimilli | G06F 12/0802 711/203 |
| 2005/0257080 | A1 * | 11/2005 | Santos | G06F 11/1438 714/5.11 |
| 2006/0041733 | A1 * | 2/2006 | Hyser | G06F 12/08 711/203 |
| 2007/0073992 | A1 * | 3/2007 | Allen | G06F 12/08 711/170 |
| 2007/0266203 | A1 * | 11/2007 | Amano | G06F 11/1456 711/111 |
| 2008/0235793 | A1 * | 9/2008 | Schunter | G06F 12/145 726/22 |
| 2008/0281884 | A1 * | 11/2008 | Subrahmanyam | G06F 8/61 |
| 2009/0216910 | A1 * | 8/2009 | Duchesneau | 709/250 |
| 2012/0239896 | A1 * | 9/2012 | Sobel | G06F 3/0608 711/165 |

OTHER PUBLICATIONS

Memory Resource Management in VMware ESX Server; Carl Waldspurger; USENIX Association Proceedings of the 5th Symposium on Operating Systems Design and Implementation; 2002.*
University of Massachusetts; CMPSCI 377 Operating Systems Lecture Notes; by Emery Berger; Fall 2009.*
Disco: Running Commodity Operating Systems on Scalable Multiprocessors; Bugnion, Devine, Govil, and Rosenblum; ACM Stanford; 2007.*
Selective Hardware/Software Memory Virtualization; Xiaolin Wang; ACM VEE 2011; Mar. 2011.*
The Design and Evolution of Live Storage Migration in VMware ESX; Mashtizadeh; USENIX Association; Jun. 2011.*
Guide to Security for Full Virtualization Technologies; by Scarfone, Souppaya, and Hoffman; NIST Jan. 2011.*
Computer Science Handbook by Allen Tucker; Second Edition; Taylor Francis 2004.*
Data Migration Techniques for VMware vSphere; White Paper; EMC Nov. 2010.*
Virtual Memory_Slides for CMSC 311_Department of Computer Science_University of Maryland 2003 as published on the internet at: https://www.cs.umd.edu/class/fall2003/cmsc311/Lectures/lecture36/virtual_memory.pdf.*
Virtual Machine Monitors: Current Technology and Future Trends by Rosenblum and Garfinkel; IEEE 2005.*

* cited by examiner

MAPPING GUEST PAGES TO DISK BLOCKS TO IMPROVE VIRTUAL MACHINE MANAGEMENT PROCESSES

CROSS-REFERENCE TO RELATED APPLICATIONS

This application claims priority from provisional patent application Ser. No. 61/595,522, filed Feb. 6, 2012, entitled "Mapping Guest Pages to Disk Blocks to Improve Virtual Machine Management Processes," the entire contents of which is hereby incorporated by reference herein.

BACKGROUND

Virtual machines (VMs) running in host computers are actively managed to improve their overall performance. One example is live migration of VMs. VMs may undergo live migration from a busy server to an underutilized server to achieve load balancing across host computers. Live migration of VMs also may be carried out to enable machine maintenance.

Live migration of a VM involves copying the memory pages of the VM from a source machine to a destination machine, and this process can take several seconds or even minutes. In some implementations, this latency is hidden by using several iterations of pre-copy while the VM is still running. Pages that are modified during a pre-copy iteration are marked "dirty" and re-sent in the next pre-copy iteration. When the set of modified pages is sufficiently small after a pre-copy iteration, the VM is stunned at the source machine and, after the modified pages have been copied over, resumes execution at the destination machine.

The pre-copy iterations consume a lot of network bandwidth, and if the link between the source machine and the destination machine is a low bandwidth link, such as over the Internet between physically separate data centers, live migration can take a long time to complete. Some simple techniques have been employed to reduce the bandwidth consumption during live migration of VMs. For example, zero pages are not transmitted and instead recreated at the destination. Other techniques to reduce the bandwidth consumption during live migration of VMs have not been attractive because of their potential to adversely impact VM performance.

SUMMARY

One or more embodiments of the present invention provide a mapping of guest memory pages to disk blocks that can be used to improve management processes performed on VMs, such as live migration and snapshots. The mapping can also be used to optimize other tasks, such as page swaps and memory error corrections.

A first method according to embodiments of the present invention is directed to selectively transmitting memory pages of a virtual machine that is running in a host computer and has a virtual disk that is stored as a file in a storage device, as part of a management process carried out by the host computer. This method includes the steps of accessing a data structure to determine that contents of a first set of memory pages of the virtual machine are also stored in the virtual disk, and transmitting for storage (i) a second set of memory pages of the virtual machine that does not include any of the memory pages in the first set and (ii) a mapping of the first set of memory pages to corresponding locations in the virtual disk where the contents of the first set of memory pages are also stored. In one embodiment, the management process is migration to another host computer and the first and second sets of memory pages represent a current state of the virtual machine to be migrated to the other host computer. In another embodiment, the management process is a process for creating a snapshot of the virtual machine and the first and second sets of memory pages represent a current state of the virtual machine.

A second method according to embodiments of the present invention is directed to managing memory pages of a virtual machine that is running in a host computer and has a virtual disk that is stored as a file in a storage device. This method includes the steps of accessing a data structure to determine that contents of a set of memory pages of the virtual machine are also stored in corresponding disk blocks of the virtual disk, and performing a management process on one or more memory pages of the virtual machine using a mapping of the set of memory pages to corresponding disk blocks of the virtual disk where the contents of the set of memory pages are also stored. The management process includes replacing contents of the one or more memory pages with data read from the virtual disk, e.g., when carrying out a page swap or memory error correction.

Further embodiments of the present invention include, without limitation, a non-transitory computer-readable storage medium that includes instructions that enable a processing unit to implement one or more aspects of the above methods as well as a computer system configured to implement one or more aspects of the above methods.

DETAILED DESCRIPTION

Figure 1:
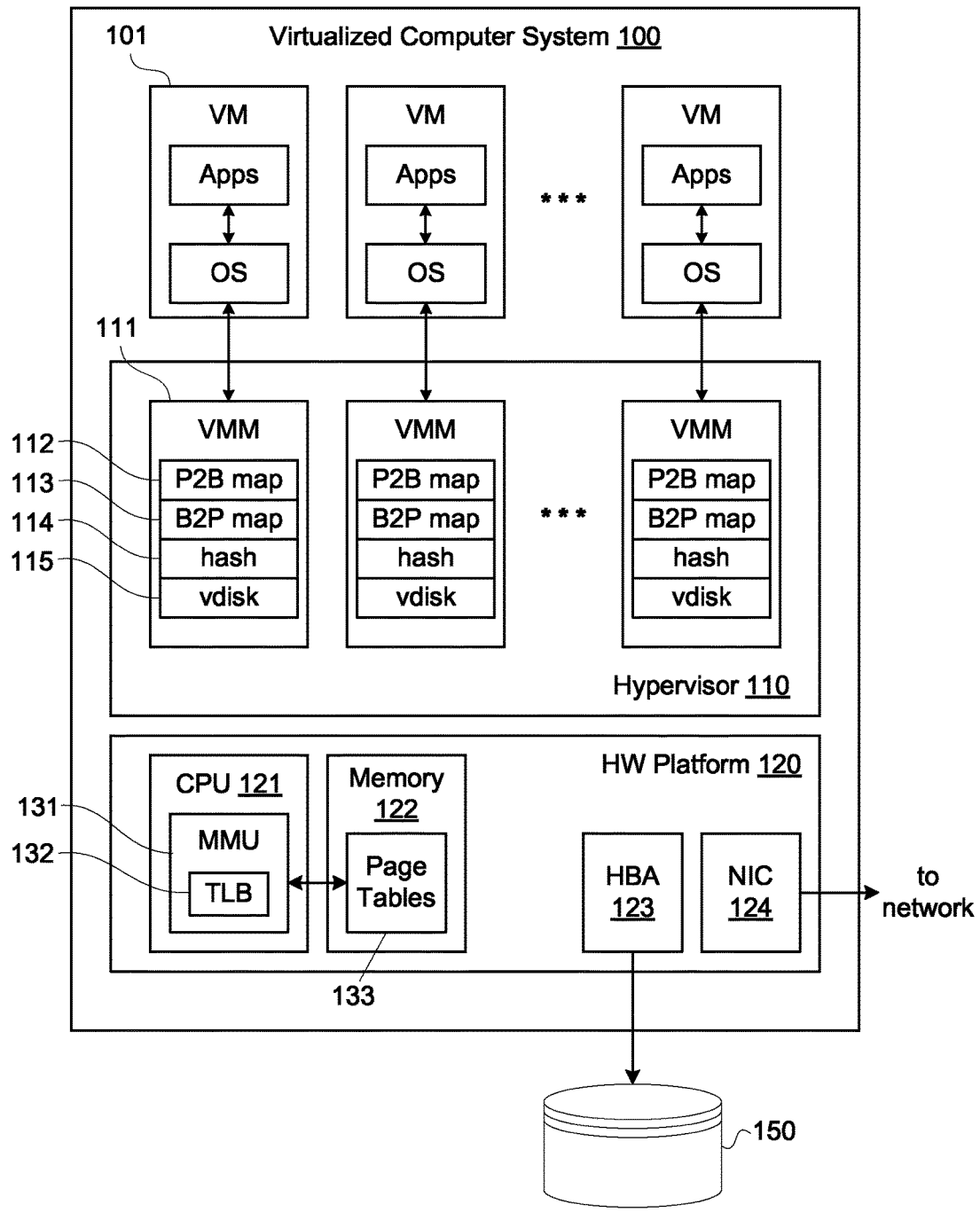
FIG. 1 depicts a block diagram of a virtualized computer system in which one or more embodiments of the present invention may be practiced.

FIG. 1 depicts a block diagram of a virtualized computer system in which one or more embodiments of the present invention may be practiced. Virtualized computer system 100 includes multiple virtual machines (VMs), including VM 101, that are running on top of hypervisor 110. Each VM is an abstraction of a physical computer system having virtual hardware resources and a guest operating system that provides guest applications running in the VM an interface to the virtual hardware resources. Hypervisor 110 includes a plurality of software layers including a kernel that manages hardware resources of hardware platform 120 through various drivers (not shown), and virtual machine monitors (VMMs) each emulating hardware resources, such as a virtual disk (vdisk), for a corresponding one of VMs. In the example illustrated in FIG. 1, VMM 111 emulates virtual disk 115 for VM 101. Hardware platform 120 includes one or more central processing unit (CPU) 121, system memory 122, a host bus adapter (HBA) 123 that connects virtualized computer system 100 to a persistent storage device 150, which may be a disk array, and a network interface card (NIC) 124 that connects virtualized computer system 100 to a network. CPU 121 has a memory management unit (MMU) 131 that carries out the mappings from the virtual address space to the physical address space using either a translation look-aside buffer (TLB) 132 or pages tables 133 stored in system memory 122. The page tables 133 stored in memory 122 include guest memory page tables and shadow page tables. Guest memory page tables are maintained by the guest operating system of a particular VM to provide mapping from guest virtual address space to guest physical address space. Shadow page tables are maintained by the VMM and provide mappings from the guest virtual address space directly to the physical address space of system memory 122. A distinct set of shadow page tables is maintained for each set of guest memory page tables maintained by guest operating systems of the VMs. In alternative embodiments of the present invention, in lieu of shadow page tables, MMU 131 is configured to support nested page tables (also referred to as extended page tables). In such embodiments, the MMU 131 is configured with a page table walker that traverses both the guest memory page tables and the nested page tables to provide mappings from the guest virtual address space to the physical address space of system memory 122.

In the embodiment of the present invention illustrated in FIG. 1, the VMM of each of the VMs maintains two mapping data structures, a P2B map (e.g., P2B map 112) and a B2P map (e.g., B2P map 113). The P2B map identifies those guest physical memory pages whose contents are also stored in disk blocks of the corresponding virtual disk, and for each such memory page, provides a mapping to the particular disk block that has the same contents stored therein. It should be recognized that more than one guest physical memory page may map to the same disk block. It should also be recognized that contents stored in disk blocks of the virtual disk are actually stored in storage device 150 because the virtual disk is represented as a file stored in storage device 150. The B2P map provides reverse mappings of the mappings maintained by the P2B map. To give one example, if guest pages GP1 and GP2 map to disk block DB1 according to the P2B map, the B2P map would indicate that disk block DB1 maps to guest pages GP1 and GP2. The B2P map is provided so that one or more guest physical memory pages that map to a particular disk block can be identified without searching through the entire P2B map. In addition to these two mapping data structures, the VMM of each VM maintains a hash table (e.g., hash table 114) that contains cryptographic hashes of page contents that are generated when input/output commands (IOs) are issued by the VM. The generation and the use of the cryptographic hashes are described in further detail below.

It should be recognized that the various terms, layers and categorizations used to describe the virtualization components in FIG. 1 may be referred to differently without departing from their functionality or the spirit or scope of the invention. One example of hypervisor 110 that may be used is included as a component of a VMware® vSphere® product, which is commercially available from VMware, Inc. of Palo Alto, Calif. ("VMware"). It should further be recognized that other virtualized computer systems are contemplated, such as hosted virtual machine systems, where hypervisor 110 is implemented in conjunction with an operating system installed on hardware platform 120. In addition, further details of memory management techniques in virtualized computer systems, including a more detailed discussion of shadow page tables, are provided in U.S. patent application Ser. No. 12/137,351, filed Jun. 11, 2008, the entire contents of which are incorporated by reference herein.

Figure 2:
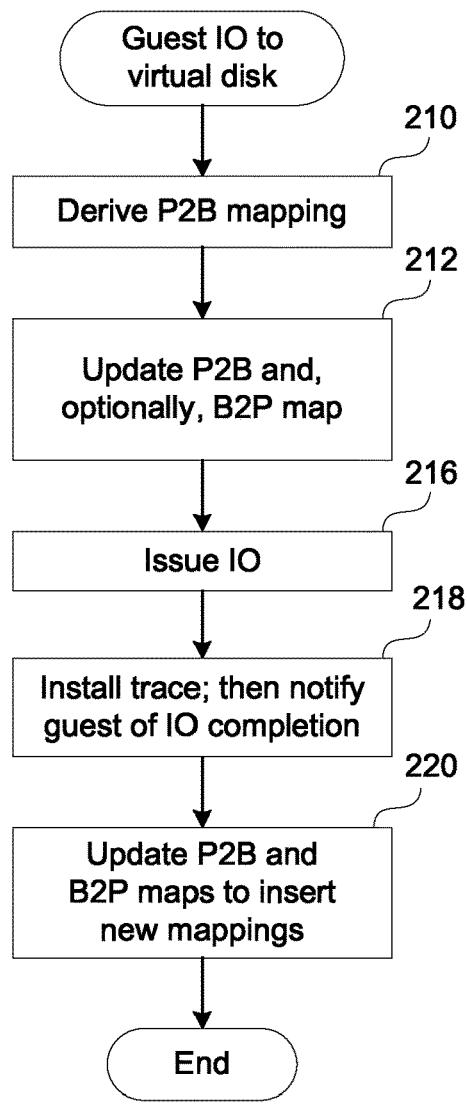
FIG. 2 is a flow diagram that illustrates a method for mapping guest physical memory pages to disk blocks of a virtual disk according to an embodiment of the present invention.

FIG. 2 is a flow diagram that illustrates a method for mapping guest physical memory pages to disk blocks of a virtual disk according to an embodiment of the present invention. In the embodiment illustrated herein, the VMM (e.g., VMM 111) is performing these steps pursuant to an IO issued by a corresponding VM (e.g., VM 101). The IO may be a read IO or a write IO and specifies the start address of the guest physical memory, the start disk block number of the virtual disk, and the length of the IO. Using this information, at step 210, the VMM derives one or more P2B mappings. At step 212, the VMM updates the P2B map and optionally the B2P map. For a read IO, the VMM examines the P2B map to remove those entries that map the guest physical memory pages involved in the IO. In one implementation, the B2P map is examined at this point and the corresponding mappings are removed. For example, if one of the derived P2B mappings is GP-to-DB and GP already has a valid entry GP-to-DB0 in the P2B map, this entry is removed from the P2B map and the corresponding entry is removed from the B2P map. In an alternative implementation, the corresponding mappings are removed from the B2P map lazily. It should be recognized that the mapping used for improving management processes according to one or more embodiments of the present invention is the P2B mapping and the presence of stale information in the B2P mapping can be tolerated. For a write IO, the VMM examines the P2B map to remove those entries that map the guest physical memory pages involved in the IO and all other entries that are mapped to the disk blocks involved in the write IO. These other entries are identified by using the B2P map and finding those guest physical memory pages that are mapped to the disk block involved in the write IO. In addition, the VMM updates the B2P map to remove those entries that map the disk blocks involved in the IO. Then, at step 216, the IO is issued. Just prior to notifying the guest of IO completion, at step 218, a trace is installed on the guest physical memory pages. This trace is triggered when the VM attempts a write operation on any of the guest physical memory pages and causes a trace handler implemented in the VMM to remove the entries corresponding to these guest physical memory pages in the P2B map. It should be recognized that any subsequent write IO that is generated, e.g., when the guest physical memory page is swapped out to the virtual disk, will trigger the method described herein for write IOs. At step 220, the VMM adds the new mappings derived at step 210 to the P2B map and corresponding reverse mappings to the B2P map. For example, if one of the derived P2B mappings is GP-to-DB, the GP-to-DB entry is added to the P2B map and DB-to-GP entry is added to the B2P map.

As an alternative to installing traces on guest physical memory pages, a data structure managed by the VMM to maintain per-page dirty bits may be used. This data structure can be checked to detect modifications to the guest physical memory pages prior to using the P2B map to optimize management processes such as the ones described in conjunction with FIGS. 5-8 below. If the dirty bit for a guest physical memory page is set, it is determined that the P2B mapping involving such guest physical memory page is no longer valid for use in the optimization.

Figure 3:
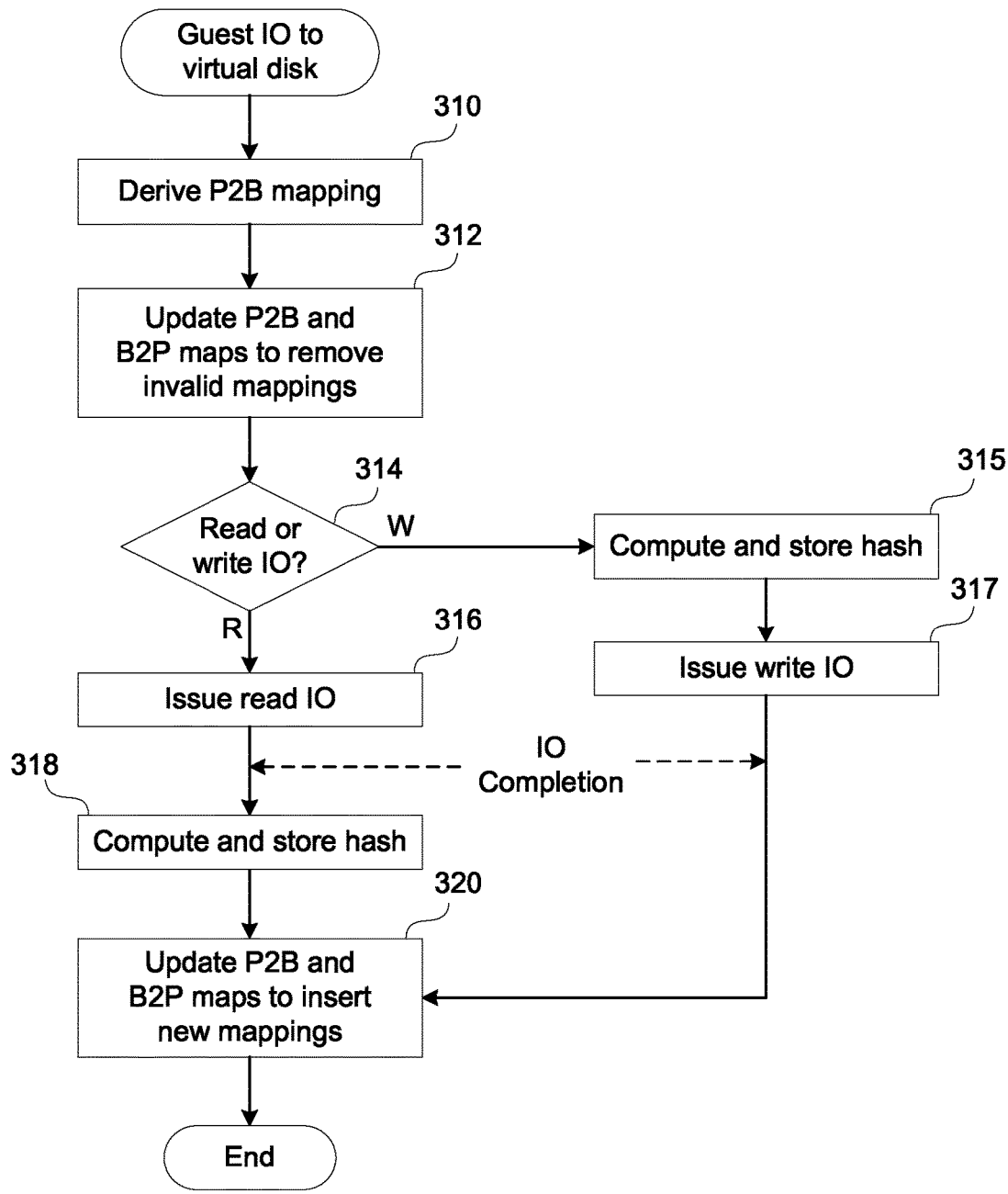
FIG. 3 is a flow diagram that illustrates a method for mapping guest physical memory pages to disk blocks of a virtual disk according to another embodiment of the present invention.

FIG. 3 is a flow diagram that illustrates a method for mapping guest physical memory pages to disk blocks of a virtual disk according to another embodiment of the present invention. In the embodiment illustrated herein, the VMM (e.g., VMM 111) is performing these steps pursuant to an IO issued by a corresponding VM (e.g., VM 101). The IO may be a read IO or a write IO and specifies the start address of the guest physical memory, the start disk block number of the virtual disk, and the length of the IO. Using this information, at step 310, the VMM derives one or more P2B mappings. At step 312, the VMM updates the P2B map and optionally the B2P map. For a read IO, the VMM examines the P2B map to remove those entries that map the guest physical memory pages involved in the IO. In one implementation, the B2P map is examined at this point and the corresponding mappings are removed. In an alternative implementation, the corresponding mappings are removed from the B2P map lazily. For a write IO, the VMM examines the P2B map to remove those entries that map the guest physical memory pages involved in the IO and all other entries that are mapped to the disk blocks involved in the write IO. These other entries are identified by using the B2P map and finding those guest physical memory pages that are mapped to the disk block involved in the write IO. In addition, the VMM updates the B2P map to remove those entries that map the disk blocks involved in the IO. Then, if the IO is a read IO, as determined at decision block 314, steps 316, 318, and 320 are carried out. The read IO is issued at step 316 and, upon completion thereof, a cryptographic hash of the contents of the guest physical memory pages involved in the IO are generated and stored in the hash table at step 318. At step 320, the VMM adds the new mappings derived at step 310 to the P2B map and corresponding reverse mappings to the B2P map.

Returning to the decision block 314, if the IO is a write IO, steps 315, 317, and 320 are carried out. When the IO is a write IO, the cryptographic hash of the contents of the guest physical memory pages involved in the IO are generated and stored in the hash table at step 315 before the write IO is issued at step 317. After step 317, the method continues onto step 320, where the VMM adds the new mappings derived at step 310 to the P2B map and corresponding reverse mappings to the B2P map.

In the embodiment of FIG. 3, the hash table is used in lieu of traces to detect modifications to the guest physical memory pages that have entries in the P2B map. Before using the P2B map to optimize management processes such as the ones described in conjunction with FIGS. 5-8 below, the hashes of the guest physical memory pages that have entries in the P2B map are generated and compared to the stored hash values provided in the hash table. If the newly generated hash value and the stored hash value of any guest physical memory page do not match, it is determined that the P2B mapping involving such a guest physical memory page is no longer valid for use in the optimization.

Figure 4:
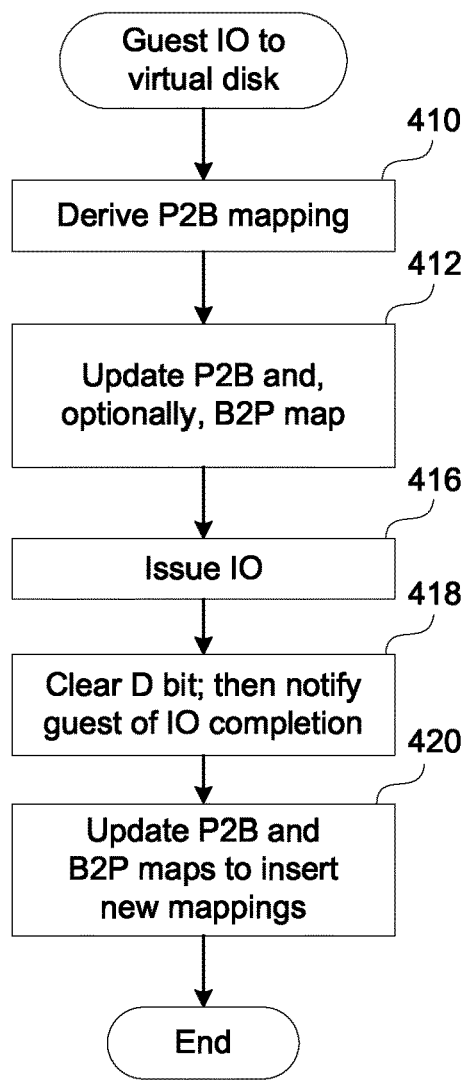
FIG. 4 is a flow diagram that illustrates a method for mapping guest physical memory pages to disk blocks of a virtual disk according to an embodiment of the present invention in which hardware support for the dirty bit in nested page tables is available.

FIG. 4 is a flow diagram that illustrates a method for mapping guest physical memory pages to disk blocks of a virtual disk according to embodiments of the present invention that employ the dirty bit (D bit) of shadow page tables or nested page tables. In the embodiments illustrated herein, the VMM (e.g., VMM 111) is performing these steps pursuant to an IO issued by a corresponding VM (e.g., VM 101). The IO may be a read IO or a write IO and specifies the start address of the guest physical memory, the start disk block number of the virtual disk, and the length of the IO. Using this information, at step 410, the VMM derives one or more P2B mappings. At step 412, the VMM examines the P2B map to remove those entries that map the guest physical memory pages involved in the IO and the B2P map to remove the corresponding mappings. The VMM also examines the B2P map to remove those entries that map the disk blocks involved in the IO, and the P2B map to remove the corresponding mappings. Then, at step 416, the IO is issued. Just prior to notifying the guest of IO completion, at step 418, the D bits in the shadow page tables or the nested page tables that are associated with the guest physical memory pages involved in the IO, are cleared. At step 420, the VMM adds the new mappings derived at step 410 to the P2B map and corresponding reverse mappings to the B2P map.

In the embodiment of FIG. 4, the D bits in the shadow page tables or the nested page tables that are associated with guest physical memory pages that have entries in the P2B map can be checked to detect modifications to the guest physical memory pages prior to using the P2B map to optimize management processes such as the ones described in conjunction with FIGS. 5-8 below. If the D bit for a guest physical memory page is set, it is determined that the P2B mapping involving such guest physical memory page is no longer valid for use in the optimization. In cases where the D bits of the shadow page tables or the nested page tables are used for other purposes and cleared, a separate data structure is used to record such changes in the D bits.

In situations where the content of disk blocks change, the P2B and B2P maps will be updated by the VMM. For example, if the VMM detects that disk block, DB, has been modified, and the P2B map includes GP1-to-DB and GP2-to-DB mappings and the B2P map includes DB-to-GP1 and DB-to-GP2 mappings, the DB-to-GP1 and DB-to-GP2 mappings in the B2P map and the GP1-to-DB and GP2-to-DB mappings in the P2B map are removed. It should be recognized that the changes to the disk block, DB, may be caused by the VM, by hypervisor 110, or some other module.

Figure 5:
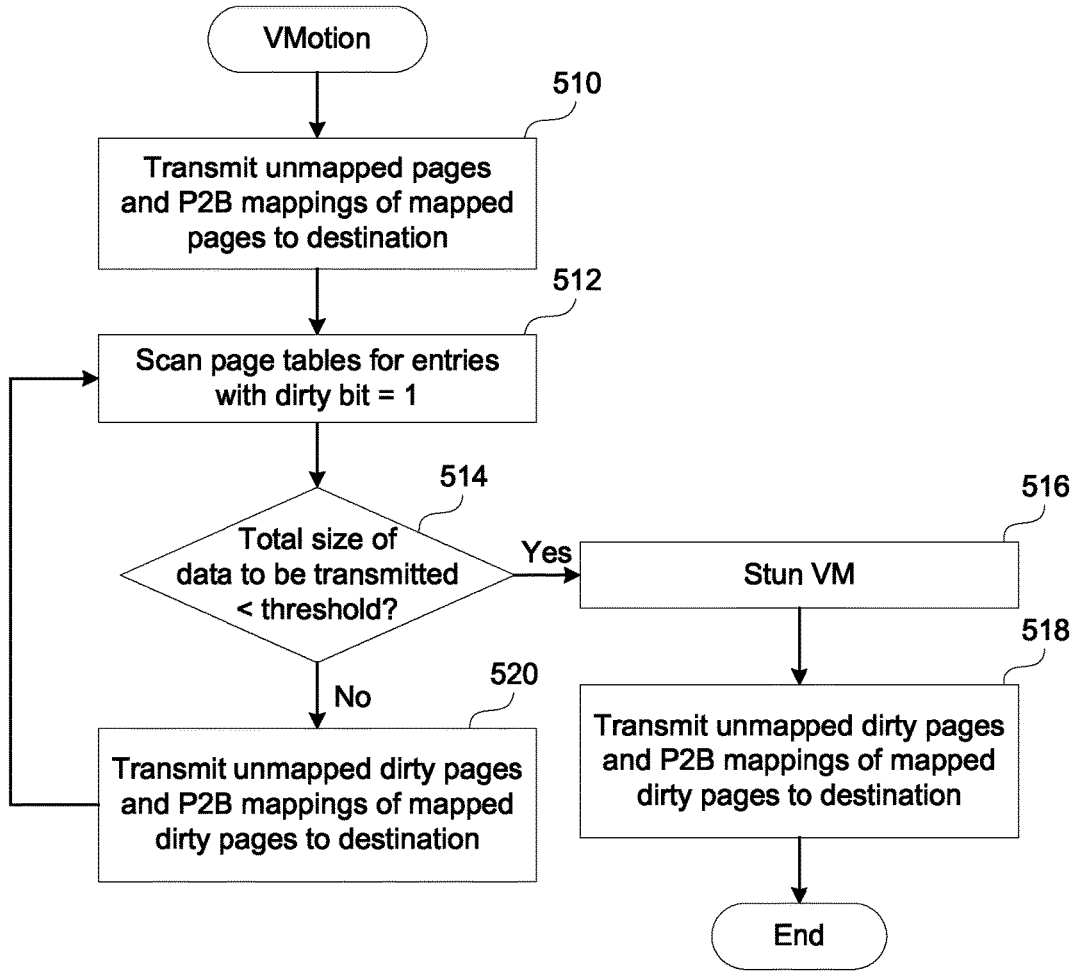
FIG. 5 is a flow diagram that illustrates the steps of a live migration process according to an embodiment of the present invention.

FIG. 5 is a flow diagram that illustrates the steps of a live migration process according to an embodiment of the present invention. In this process, an executing state of a VM is being migrated from a source server to a destination server. In the embodiment illustrated herein, hypervisor 110 is carrying out this process and, in doing so, transmits all guest physical memory pages of the VM to the destination server over a network for storage in the system memory configured in the destination server. As a way to reduce the downtime of the VM, the VM is stunned and execution control is switched over to the destination server only when the total size of the guest physical memory pages left to be transmitted to the destination server is below a certain threshold.

At step 510, the P2B map is examined and all guest physical memory pages of the VM that do not have valid mappings in the P2B map are transmitted to the destination server. The guest physical memory pages of the VM that do have valid mappings in the P2B map are not transmitted, and in lieu thereof, their mappings are transmitted to the destination server. When tracing is employed to detect modifications to the guest physical memory pages that have mappings in the P2B map, mappings that become invalid as a result of the modifications are removed from the P2B map by virtue of the trace handling process described above. As a result, all mappings in the P2B map are deemed valid in such an embodiment. On the other hand, when cryptographic hashes or nested page D bits are used to detect modifications to the guest physical memory pages that have mappings in the P2B map, the validity of the mappings need to be checked in the manner described above prior to carrying out step 510 and only the mappings of "unmodified" guest physical memory pages are deemed to be valid.

While step 510 is being carried out, the VM continues to run and some of the guest physical memory pages that have been copied become dirtied and D bits in the entries of page tables corresponding to these guest physical memory pages will be set. At step 512, the VM's page tables are scanned for entries that have the dirty bit set, i.e., for guest physical memory pages that have been modified since the last iteration. Then, at step 514, the total size of data to be transmitted to the destination server is computed and compared against a threshold. If the total size computed at step 514 is not less than the threshold, at step 520, all dirty guest physical memory pages that do not have valid mappings in the P2B map are transmitted to the destination server. The dirty guest physical memory pages of the VM that do have valid mappings in the P2B map are not transmitted, and in lieu thereof, their mappings are transmitted to the destination server. The method then returns to step 512.

Returning to the decision block at step 514, if the total size computed at step 514 is less than the threshold, the VM is stunned at step 516 and, at step 518, all dirty guest physical memory pages that do not have valid mappings in the P2B map are transmitted to the destination server. The dirty guest physical memory pages of the VM that do have valid mappings in the P2B map are not transmitted, and in lieu thereof, their mappings are transmitted to the destination server. After step 518, the method terminates, and hypervisor 110 is allowed to hand over execution control of the VM to the destination server.

After live migration has concluded, it is desirable to read into memory as soon as possible the contents of disk blocks that are mapped in the P2B mappings that are migrated to the destination server, because writes to such disk blocks by other processes are possible. When a write to such a disk block is detected, it is delayed until the content of the disk block is read into memory at the destination server. Similarly, writes to memory pages that are mapped to disk blocks in the P2B mappings are possible. If such a write is detected, it is delayed until the corresponding content is read into memory from the disk block.

In the live migration process described above, when cryptographic hashes are used to detect modifications to the guest physical memory pages that have mappings in the P2B map, at steps 510, 518 and 520, the staleness of the entries in the P2B map is checked by generating the hashes of the guest physical memory pages that have entries in the P2B map and comparing them to the stored hash values provided in the hash table. If the newly generated hash value and the stored hash value of any guest physical memory page do not match, it is determined that the P2B mapping involving such a guest physical memory page is stale and no longer valid for use in the live migration process.

Embodiments of the present invention may be applied advantageously to particular use cases of virtual machine migration. The first is virtual machine migration over low bandwidth links. According to embodiments of the present invention, only a subset of VM's physical memory pages are transmitted to the destination. For the remainder of VM's physical memory pages, only their mappings to the virtual disk are transmitted. The reduction of the amount of data transmitted over the low bandwidth link speeds up virtual machine migration considerably. The second is virtual machine migration performed when shutting down a host computer for maintenance. In preparation for this, multiple VMs may need to be migrated to a different host computer at about the same time. In such a scenario, the time savings per VM may not be too big but the time savings multiplied over many VMs can become significant.

Figure 6:
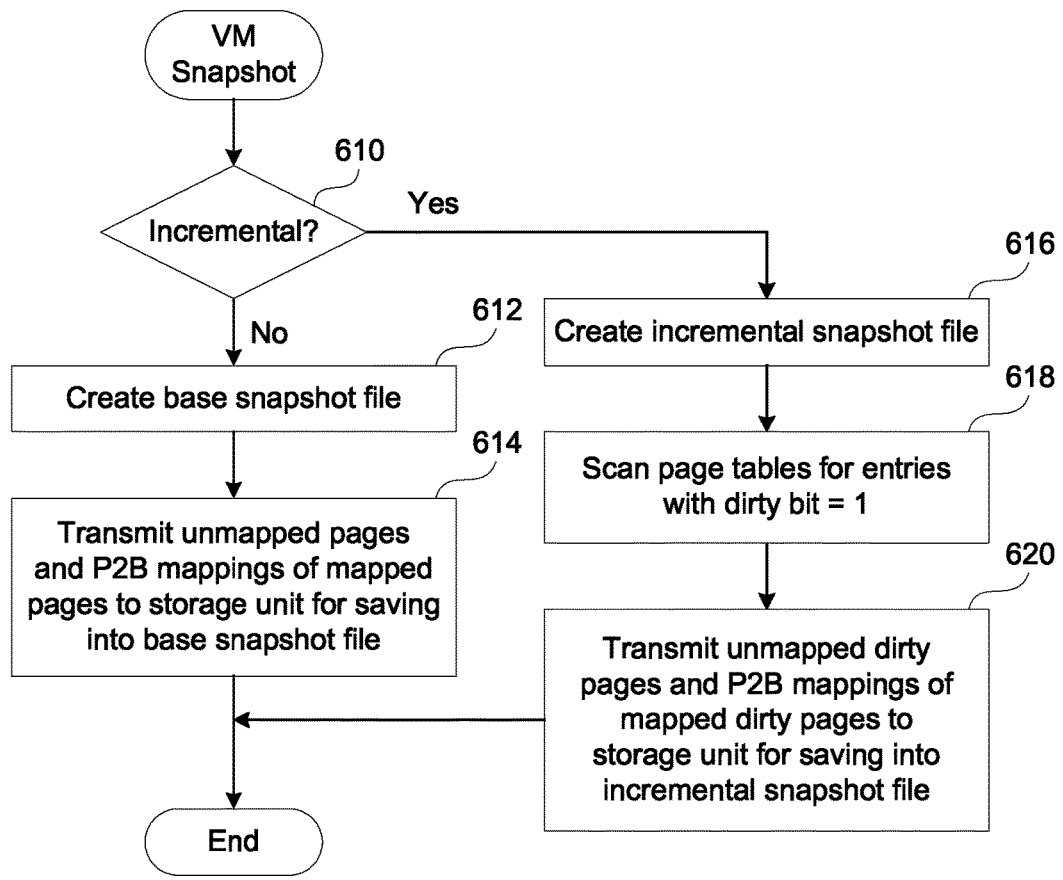
FIG. 6 is a flow diagram that illustrates the steps of a snapshot process according to an embodiment of the present invention.

FIG. 6 is a flow diagram that illustrates the steps of a snapshot process that is carried out according to an embodiment of the present invention. In this process, a snapshot of an executing state of a VM is taken and transmitted to storage device 150 for storage therein. The snapshot that is taken may be a base snapshot or an incremental snapshot. The base snapshot captures the entire state of the VM and the incremental snapshot captures only the changes to the state of the VM since the last snapshot. In the embodiment illustrated herein, hypervisor 110 is carrying out this process and, in doing so, transmits the snapshot to storage device 150 for storage therein.

At step 610, it is determined whether the snapshot is a base snapshot or an incremental snapshot. If it is a base snapshot, the base snapshot file is created at step 612. At step 614, the P2B map is examined and all guest physical memory pages of the VM that do not have valid mappings in the P2B map are transmitted to storage device 150 for saving into the base snapshot file. The guest physical memory pages of the VM that do have valid mappings in the P2B map are not transmitted, and in lieu thereof, their mappings are transmitted to storage device 150 for saving into the base snapshot file.

Returning to step 610, if it is determined that the snapshot is an incremental snapshot, the incremental snapshot file is created at step 616. Then, at step 618, the VM's page tables are scanned for entries that have the dirty bit set, i.e., for guest physical memory pages that have been modified since the snapshot was taken. Then, at step 620, all dirty guest physical memory pages that do not have valid mappings in the P2B map are transmitted to storage device 150 for saving into the incremental snapshot file. The dirty guest physical memory pages of the VM that do have valid mappings in the P2B map are not transmitted, and in lieu thereof, their mappings are transmitted to storage device 150 for saving into the incremental snapshot file.

After the snapshot is created based on the method described above, writes to disk blocks that are mapped in the P2B mappings saved as part of the snapshot are monitored. When a write to such a disk block is detected, the original content of the disk block is copied to a different disk block and the P2B mapping is changed to point to the different disk block. In addition, writes to memory pages that have mappings in the P2B mappings saved as part of the snapshot are monitored during VM resumption or reversion. If such a write is detected, it is delayed until the corresponding content has been read into memory from the disk block.

In the snapshot process described above, when cryptographic hashes are used to detect modifications to the guest physical memory pages that have mappings in the P2B map, at steps 614 and 620, the staleness of the entries in the P2B map is checked by generating the hashes of the guest physical memory pages that have entries in the P2B map and comparing them to the stored hash values provided in the hash table. If the newly generated hash value and the stored hash value of any guest physical memory page do not match, it is determined that the P2B mapping involving such a guest physical memory page is stale and no longer valid for use in the snapshot process.

Figure 7:
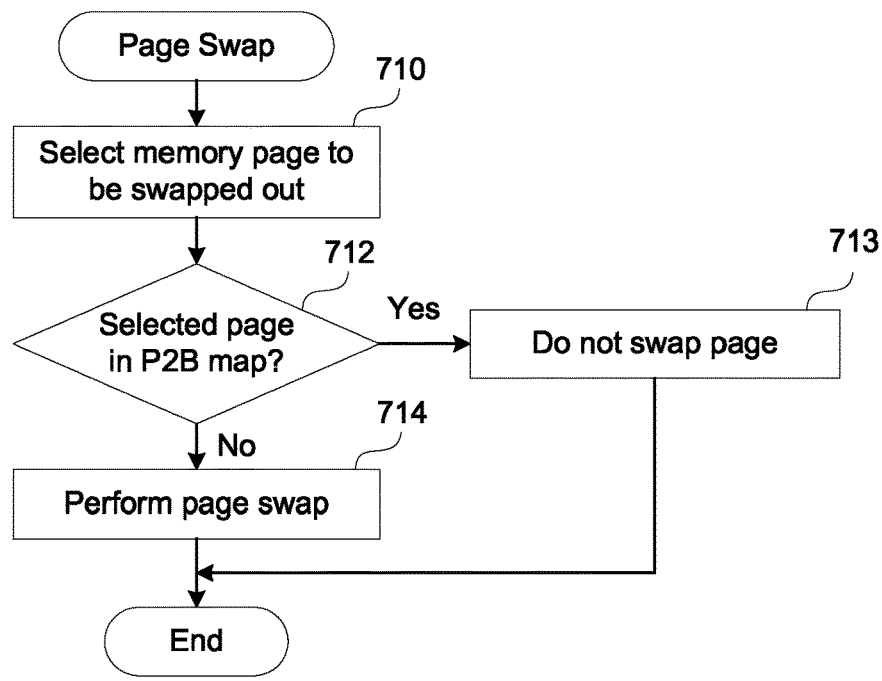
FIG. 7 is a flow diagram that illustrates the steps of a page swap process according to an embodiment of the present invention.

FIG. 7 is a flow diagram that illustrates the steps of a page swap process according to an embodiment of the present invention. In the embodiment illustrated herein, the VMM is carrying out this process and, in doing so, swaps the current contents of a guest physical memory page out to a swap file on the virtual disk, swaps in new contents of the guest physical memory page from the swap file on the virtual disk, and updates swap file mappings accordingly. At step 710, the guest physical memory page to be swapped out is selected according to known techniques, such as ones based on the clock algorithm or the least-recently used (LRU) algorithm. At step 712, the P2B map is examined to see if the selected guest physical memory page has a valid entry therein. If so, the current contents of the selected guest physical memory page are not swapped out to the virtual disk (step 713). If the selected guest physical memory page does not have a valid entry in the P2B table, at step 714, a page swap is performed according to conventional techniques. In this method, if a write to a disk block to which the selected guest physical memory page is mapped is detected, the P2B and B2P maps are updated to remove invalid mappings as previously described. In addition, the original content of the disk block is copied to a different disk block and the swap file mapping that points to the modified disk block is changed to point to the different disk block.

In the swap process described above, when cryptographic hashes are used to detect modifications to the guest physical memory pages that have mappings in the P2B map, at step 712, the staleness of the entry in the P2B map is checked by generating the hash of the selected guest physical memory page and comparing it to the stored hash value provided in the hash table. If the newly generated hash value and the stored hash value of the selected guest physical memory page do not match, it is determined that the P2B mapping involving the selected guest physical memory page is stale and no longer valid for use in the page swap process.

Figure 8:
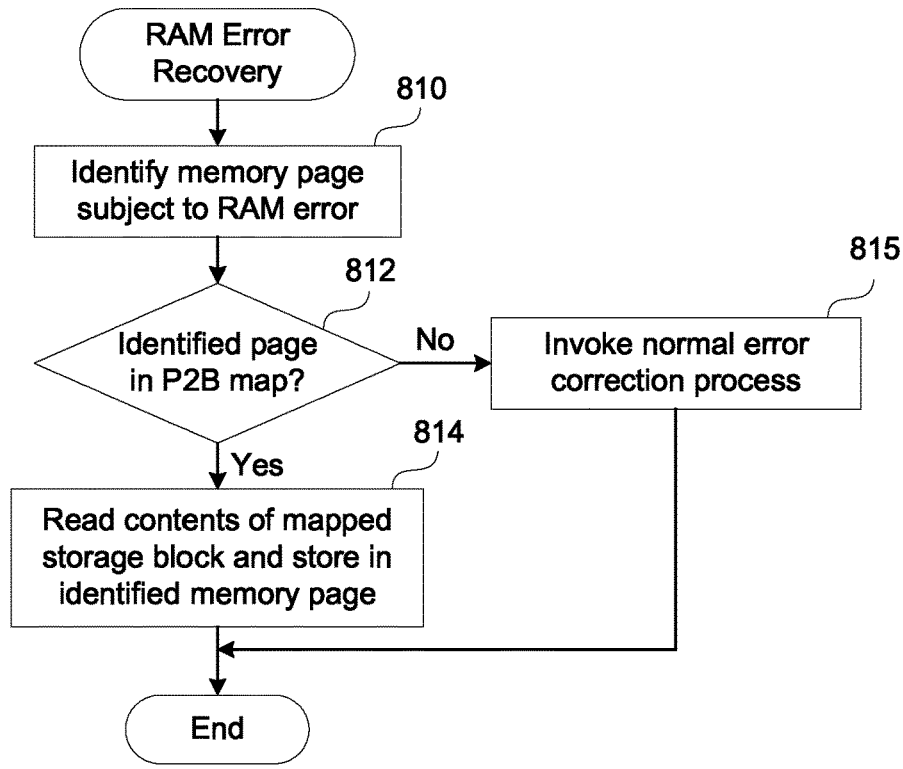
FIG. 8 is a flow diagram that illustrates the steps of a memory error correction process according to an embodiment of the present invention.

FIG. 8 is a flow diagram that illustrates the steps of a memory error correction process according to an embodiment of the present invention. In the embodiment illustrated herein, the VMM is carrying out this process by either reading in contents from a copy maintained in the virtual disk or by conventional means. At step 810, the guest physical memory page that is subject to RAM error is identified according to known techniques. At step 812, the P2B map is examined to see if the identified guest physical memory page has a valid entry therein. If so, contents are read from the disk block to which the identified guest physical memory page maps, according to the P2B map, and written into the identified guest physical memory page (step 814). If, before step 814 is completed, a write to the disk block to which the identified guest physical memory is detected, the write is delayed until the content of the disk block is read into the identified guest physical memory. Similarly, if a write to the identified guest physical memory is detected, it is delayed until the corresponding content has been read into memory from the disk block. If the identified guest physical memory page does not have a valid entry in the P2B table, a conventional error correction process is invoked (step 815). In the memory error correction process described above, when cryptographic hashes are used to detect modifications to the guest physical memory pages that have mappings in the P2B map, at step 812, the staleness of the entry in the P2B map is checked by generating the hash of the identified guest physical memory page and comparing it to the stored hash value provided in the hash table. If the newly generated hash value and the stored hash value of the identified guest physical memory page do not match, it is determined that the P2B mapping involving the identified guest physical memory page is stale and no longer valid for use in the memory error correction process.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of selectively transmitting contents of guest physical memory pages of a virtual machine that is running in a host computer and has a virtual disk that is stored in a storage device, as part of a management process carried out by the host computer, said method comprising:
updating first and second data structures when any of first and second mappings become invalid; and
performing the management process on one or more guest physical memory pages of the virtual machine using the first data structure, wherein the first data structure provides first mappings of a set of guest physical memory pages of the virtual machine to corresponding disk blocks of the virtual disk of the virtual machine that store the same contents as the set of guest physical memory pages, wherein the second data structure provides second mappings of disk blocks of the virtual disk to guest physical memory pages of the virtual machine that have the same contents as the disk blocks, and
wherein the management process includes transmitting for storage, (i) contents of other guest physical memory pages of the virtual machine, wherein the other guest physical memory pages do not include any of the guest physical memory pages in the set of guest physical memory pages, and (ii) the first mappings of the set of guest physical memory pages but not contents thereof.

2. The method of claim 1, wherein the first mappings identify disk blocks of the virtual disk that are associated with the set of guest physical memory pages.

3. The method of claim 2, wherein the first mappings identify at least one disk block of the virtual disk that is associated with multiple guest physical memory pages in the set of guest physical memory pages.

4. The method of claim 2, further comprising updating the first data structure when a guest physical memory page in the set of guest physical memory pages is modified to remove the mapping from the modified guest physical memory page to a disk block of the virtual disk.

5. The method of claim 4, further comprising updating the second data structure to remove a reverse mapping of the disk block to the modified guest physical memory page.

6. The method of claim 1, wherein
the management process is migration to another host computer as a destination for the transmitting, and
the set of guest physical memory pages and the other guest physical memory pages represent a current state of the virtual machine to be migrated to the other host computer.

7. The method of claim 6, wherein the contents of the other guest physical memory pages and the first mappings of the set of guest physical memory pages are transmitted to the other host computer.

8. The method of claim 1, wherein the management process is a process for creating a snapshot of the virtual machine and the set of guest physical memory pages and the other guest physical memory pages represent a current state of the virtual machine.

9. The method of claim 8, wherein the contents of the other guest physical memory pages and the first mappings of the set of guest physical memory pages are transmitted to the storage device.

10. The method of claim 1, wherein said updating includes:
generating hash values of guest physical memory pages of the virtual machine and comparing the generated hash values against stored hash values; and
determining that contents of one or more of said guest physical memory pages of the virtual machine are not stored in the virtual disk when the generated hash values of the guest physical memory pages do not match the stored hash values.

11. A computer system comprising:
a processor programmed to execute instructions for a virtual machine and a management process for the virtual machine;
a system memory that includes guest physical memory pages of the virtual machine;
a storage device that stores a virtual disk for the virtual machine;
a first data structure that provides first mappings of a set of guest physical memory pages of the virtual machine to corresponding disk blocks of the virtual disk of the virtual machine that store the same contents as the set of guest physical memory pages; and
a second data structure that provides second mappings of disk blocks of the virtual disk to guest physical memory pages of the virtual machine that have the same contents as the disk blocks,
wherein the processor is configured to update the first and second data structures when any of the first and second mappings become invalid and to perform the management process on one or more guest physical memory pages of the virtual machine using the first data structure,
wherein the management process includes transmitting for storage, (i) contents of other guest physical memory pages of the virtual machine, wherein the other guest physical memory pages do not include any of the guest physical memory pages in the set of guest physical memory pages, and (ii) the first mappings of the set of guest physical memory pages but not contents thereof.

12. The computer system of claim 11, wherein the management process is a page swap and, prior to replacing, contents of the one or more guest physical memory pages are written out to the virtual disk.

13. The computer system of claim 12, wherein the one or more guest physical memory pages are not in the set of guest physical memory pages.

14. The computer system of claim 13, wherein the management process further includes determining that a guest physical memory page is in the set of guest physical memory pages and not performing the page swap for said guest physical memory page.

15. The computer system of claim 11, wherein the management process is a memory error recovery and, prior to replacing, the first mappings of the set of guest physical memory pages are used to identify one or more disk blocks of the virtual disk corresponding to the one or more guest physical memory pages, and replacement data are read from the corresponding disk blocks.

16. The computer system of claim 11, wherein the first mappings of the set of guest physical memory pages identify disk blocks of the virtual disk that are associated with the set of guest physical memory pages.

17. The computer system of claim 16, wherein the first mappings of the set of guest physical memory pages identify at least one disk block of the virtual disk that is associated with multiple guest physical memory pages in the set of guest physical memory pages.

18. The computer system of claim 16, wherein the management process further includes updating the first data structure when a guest physical memory page in the set of guest physical memory pages is modified to remove a mapping from the modified guest physical memory page to a disk block.

19. The computer system of claim 18, wherein the management process further includes updating the second data structure to remove a reverse mapping of the disk block to the modified guest physical memory page.

20. A non-transitory computer-readable storage medium comprising:
   a first data structure that provides first mappings of a set of guest physical memory pages of a virtual machine to corresponding disk blocks of a virtual disk of the virtual machine that store the same contents as the set of guest physical memory pages;
   a second data structure that provides second mappings of disk blocks of the virtual disk to guest physical memory pages of the virtual machine that have the same contents as the disk blocks; and
   instructions for causing a computer system to update the first and second data structures when any of the first and second mappings become invalid and to perform a management process on one or more guest physical memory pages of the virtual machine using the first data structure,
   wherein the management process includes transmitting for storage, (i) contents of other guest physical memory pages of the virtual machine, wherein the other guest physical memory pages do not include any of the guest physical memory pages in the set of guest physical memory pages, and (ii) the first mappings of the set of guest physical memory pages but not contents thereof.

* * * * *